United States Patent
Fisher et al.

(10) Patent No.: US 11,315,775 B2
(45) Date of Patent: Apr. 26, 2022

(54) VARIABLE DISCRIMINATOR THRESHOLD FOR ION DETECTION

(71) Applicant: PERKINELMER HEALTH SCIENCES CANADA, INC., Woodbridge (CA)

(72) Inventors: William Fisher, Ontario (CA); Bohdan Atamanchuk, Mississauga (CA)

(73) Assignee: PERKINELMFR HEALTH SCIENCES CANADA, INC., Woodbridge (CA)

( * ) Notice: Subject to any disclaimer, the term of this patent is extended or adjusted under 35 U.S.C. 154(b) by 209 days.

(21) Appl. No.: 16/739,536

(22) Filed: Jan. 10, 2020

(65) Prior Publication Data
US 2021/0217600 A1    Jul. 15, 2021

(51) Int. Cl.
| | |
|---|---|
| *H01J 49/02* | (2006.01) |
| *H01J 49/00* | (2006.01) |
| *H01J 49/40* | (2006.01) |
| *H01J 49/44* | (2006.01) |
| *G01N 30/62* | (2006.01) |

(Continued)

(52) U.S. Cl.
CPC ............ *H01J 49/025* (2013.01); *G01N 30/62* (2013.01); *G01N 30/64* (2013.01); *G01N 30/86* (2013.01); *G01N 30/8617* (2013.01); *G01N 30/95* (2013.01); *H01J 49/0036* (2013.01); *H01J 49/40* (2013.01); *H01J 49/446* (2013.01); *G01N 2030/621* (2013.01)

(58) Field of Classification Search
CPC ...... H01J 49/025; H01J 49/0036; H01J 49/40; H01J 49/446; G01N 30/86; G01N 30/8617; G01N 30/62; G01N 30/95; G01N 30/64; G01N 2030/621
USPC ................................................ 250/281, 282
See application file for complete search history.

(56) References Cited

U.S. PATENT DOCUMENTS

| | | | |
|---|---|---|---|
| 4,002,909 A | 1/1977 | Packard et al. | |
| 6,229,142 B1 * | 5/2001 | Bateman | H01J 49/0036 250/287 |

(Continued)

FOREIGN PATENT DOCUMENTS

WO    WO2012/080443    6/2012

OTHER PUBLICATIONS

International Search Report and Written Opinion in corresponding PCT Application No. PCT/CA2021/050006, dated Apr. 26, 2021, pp. 1-8.

*Primary Examiner* — Kiet T Nguyen
(74) *Attorney, Agent, or Firm* — Fish & Richardson P.C.

(57) ABSTRACT

An example system includes an ion detector and a signal processing apparatus in communication with the ion detector. The ion detector is arranged to detect ions during operation of the system and to generate a signal pulse in response to the detection of an ion. The signal pulse has a peak amplitude related to at least one operational parameter of the system. The signal processing apparatus is configured to analyze signal pulses from the ion detector and determine information about the detected ions during operation of the system based on the signal pulses. The signal processing apparatus includes a discriminator circuit. The signal processing apparatus is programmed to vary a threshold of the discriminator circuit based on the at least one operational parameter of the system during operation of the system.

22 Claims, 9 Drawing Sheets

(51) Int. Cl.
*G01N 30/95* (2006.01)
*G01N 30/64* (2006.01)
*G01N 30/86* (2006.01)

(56) References Cited

U.S. PATENT DOCUMENTS

| | | |
|---|---|---|
| 7,084,393 B2 | 8/2006 | Fuhrer et al. |
| 7,501,621 B2 | 3/2009 | Willis et al. |
| 8,173,957 B2 | 5/2012 | Hofstadler et al. |
| 2002/0175292 A1* | 11/2002 | Whitehouse .......... H01J 49/025 250/394 |
| 2005/0006577 A1* | 1/2005 | Fuhrer .................... H01J 49/40 250/287 |
| 2013/0264474 A1* | 10/2013 | Kholomeev .......... H01J 49/025 250/287 |
| 2013/0268212 A1* | 10/2013 | Makarov ............. H01J 49/0036 702/32 |
| 2015/0325420 A1* | 11/2015 | Collings ............. H01J 49/0031 250/282 |

* cited by examiner

VARIABLE DISCRIMINATOR THRESHOLD FOR ION DETECTION

BACKGROUND

Mass spectrometry is an analytical method that measures the mass-to-charge ratio of ions. In some implementations, mass spectrometry can be used to generate a mass spectrum representing one or more ion samples (e.g., a plot of intensity as a function of the mass-to-charge ratio of each sample). Samples can be identified and/or distinguished from other samples based on the mass spectrum.

SUMMARY

In an aspect, a system includes an ion detector arranged to detect ions during operation of the system and to generate a signal pulse in response to the detection of an ion. The signal pulse has a peak amplitude related to at least one operational parameter of the system. The system also includes a signal processing apparatus in communication with the ion detector and configured to analyze signal pulses from the ion detector and determine information about the detected ions during operation of the system based on the signal pulses. The signal processing apparatus includes a discriminator circuit. The signal processing apparatus is programmed to vary a threshold of the discriminator circuit based on the at least one operational parameter of the system during operation of the system.

Implementations of this aspect can include one or more of the following features.

In some implementations, the discriminator circuit can be an analog circuit.

In some implementations, the operation parameter can be selected from the group of: (i) a mass-to-charge ratio of the detected ions and (ii) a count rate of the detected ions.

In some implementations, the signal processing apparatus can be programmed to reduce the threshold for increasing mass-to-charge ratios of the detected ions.

In some implementations, the signal processing apparatus can include a memory storing a lookup table relating different values for the at least one operational parameter to different thresholds for the discriminator circuit, and the signal processing apparatus can be programmed to vary the threshold according to the lookup table.

In some implementations, the signal processing apparatus can be programmed to vary the threshold based on measurement of the at least one operational parameter during operation of the system.

In some implementations, the signal processing apparatus can be programmed to vary the threshold using feedback based on a detected ion count rate during operation of the system.

In some implementations, the signal processing apparatus can be programmed to vary the threshold so that signal pulses from ions having different masses have approximately equal full-width-at-half-maximum (FWHM) values.

In some implementations, the signal processing apparatus can be arranged so that the discriminator circuit receives the signal pulses directly from the ion detector.

In some implementations, the signal processing apparatus can further include an amplifier arranged to receive signals from the ion detector and send amplified signals to the discriminator circuit.

In some implementations, the ion detector can be a discrete-dynode detector.

In some implementations, the system can be a mass spectrometry (MS) system including an ion source.

In some implementations, the MS system can be an inductively coupled plasma MS (ICP-MS) system.

In some implementations, the MS system can include a quadrupole mass analyzer in an ion path from the ion source to the ion detector.

In another aspect, a method includes receiving a series of electrical pulses from an ion detector. Each pulse corresponds to detection of one or more ions by the ion detector. Electrical pulse has an amplitude and a peak width related to an operational parameter of a system comprising the ion detector. The method also includes filtering the series of electrical pulses using a discriminator having a variable threshold to provide a series of filtered electrical pulses. The filtering includes adjusting the variable threshold based on a value of the operational parameter for each electrical pulse. The method also includes analyzing the series of filtered electrical pulses to determine information about the one or more ions detected by the ion detector.

Implementations of this aspect can include one or more of the following features.

In some implementations, the operation parameter can be selected from the group of parameters of: (i) a mass-to-charge ratio of each ion and (ii) a count rate.

In some implementations, the operational parameter can be the mass-to-charge ratio and the variable threshold can be decreased for ions with increasing mass-to-charge ratio.

In some implementations, the operational parameter can be the count rate and the variable threshold of the discriminator can be decreased for increasing count rates.

In some implementations, the information about the one or more ions can include a mass of each of the one or more ions.

In another aspect, a non-transitory computer readable medium includes program instructions to cause a signal processing apparatus to perform various operations. The operations include receiving a series of electrical pulses from an ion detector. Each pulse corresponds to detection of one or more ions by the ion detector. Each electrical pulse has an amplitude and a peak width related to an operational parameter of a system comprising the ion detector. The operations also include filtering the series of electrical pulses using a discriminator having a variable threshold to provide a series of filtered electrical pulses. The filtering includes adjusting the variable threshold based on a value of the operational parameter for each electrical pulse. The operations also include analyzing the series of filtered electrical pulses to determine information about the one or more ions detected by the ion detector.

The details of one or more embodiments are set forth in the accompanying drawings and the description below. Other features advantages will be apparent from the description and drawings, and from the claims.

DETAILED DESCRIPTION

Figure 1:
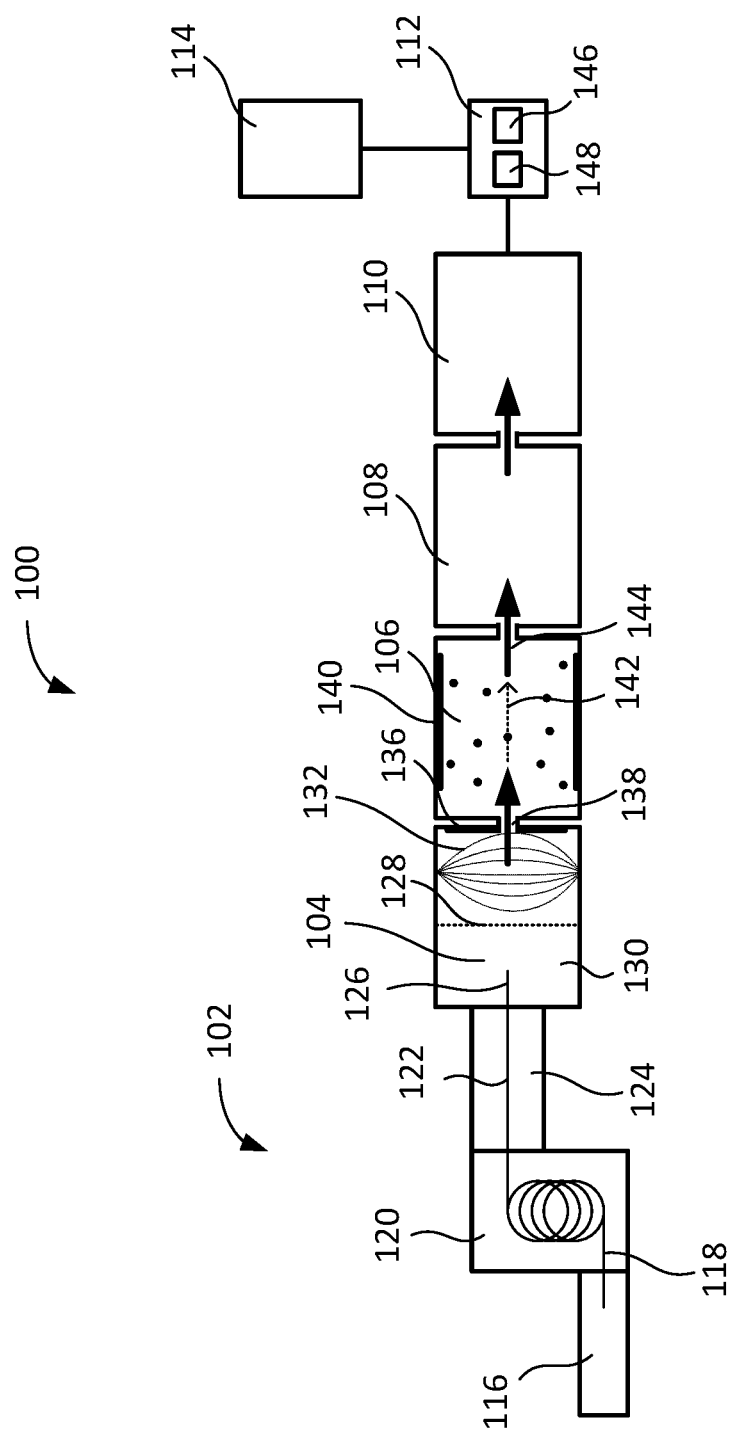
FIG. 1 is a schematic diagram of example mass spectrometry system.

A mass spectrometry system includes an ion detector that generates a time-dependent electric output signal (e.g., a time-dependent voltage signal or a time dependent current signal) corresponding to the arrival of sample ions. To analyze samples using mass spectrometry, the intensity of the ion flux is measured (e.g., the number of ions that are detected by the ion detector per second). A discriminator module receives the output signal, and distinguishes between changes in the output signal corresponding to the arrival of a particular ion and changes in the output signal resulting from other factors (e.g., signal noise).

For example, the arrival of an ion at the ion detector induces a charge or a current, which results in a corresponding pulse in the output signal. The discriminator module can compare the amplitude of the pulse to a threshold level (e.g., a "discriminator threshold"), such as a threshold voltage value (or, alternatively a threshold current value if the pulse is a current pulse). If the output signal exceeds the threshold level at a particular point in time, the discriminator module can determine that an ion had arrived at the ion detector at that time. However, if the output signal remains below the threshold level during a period of time, the discriminator module can determine that an ion did not arrive at the ion detector during that time. Accordingly, the effects of signal noise in the output signal are suppressed.

In some implementations, the amplitude of peaks in an output signal may vary based on factors such as the mass of an ion, the mass-to charge ratios (m/z) of the ion, the count rate of the ion detector, or any combination thereof. Signals with larger amplitudes also tend to have longer duration than lower amplitude signals. Thus, the amount of time a particular pulse is above the threshold level is not uniform and may depend on the m/z of the ion, the count rate of the ion detector, or both. Accordingly, using a single fixed threshold level may not be suitable in all circumstances. It is noted that the signal may be a voltage or a current signal and, therefore, the threshold value may be a voltage threshold or a current threshold. Embodiments described herein are described in the context of a voltage signal, but the same techniques apply equally to current signals.

The varying amplitudes of the pulses, and the associated variation in the duration of the pulses, may affect the ability to accurately determine the intensity of the ion flux (e.g., the ion count rate). By way of example, the discriminator module may receive the output signal from the ion detector and output a discriminator signal at a fixed voltage (or current) for the duration the output signal from the ion detector is above the threshold level (e.g., a square wave pulse). Thus, the discriminator module may output a longer square wave pulse for high amplitude pulses with a longer duration than lower amplitude pulses with a shorter duration. Each pulse receive by the discriminator module creates a detection "dead time" (i.e., a period of time during which the electronics are not able to detect a subsequent pulse because the electronics are not able to distinguish between a single pulse and two pulses, the second pulse falling within the dead time created by the first pulse). Longer square wave pulses output by the discriminator module create longer dead times than square wave pulses of shorter duration. Because ion count rate accuracy decreases with longer dead times (due to the inability to count pulses that arrive at the discriminator during the dead time), it may be beneficial to not only shorten the dead time but also make the dead time substantially uniform for every pulse, independent of m/z.

In some embodiments, the accuracy of the ion count rate can be made more accurate by reducing the dead time after each individual pulse. In some embodiments, the discriminator module can be configured to process output signals from the ion detector according to a variable threshold level (e.g., a variable discriminator threshold). In some embodiments, the threshold level can be varied according to the mass of an ion, the m/z of the ion, the count rate of the ion detector, or any combination thereof. This can be beneficial, for example, in enabling the discriminator module to distinguish between pulses corresponding to the arrival of ions at the ion detector from pulses corresponding to other events (e.g., signal noise) more effectively in a wider array of use cases. Further, the system may exhibit a linear response (or an approximately linear response) over a wider dynamic range.

In some embodiments, the discriminator threshold may be selected to be closer to the peak amplitude of the pulse thereby shortening the dead time (e.g., the amount of time the pulse is above the discriminator threshold level). For example, the discriminator threshold level for pulses with larger peak amplitudes may be greater than the discriminator threshold level for pulses with smaller peak amplitudes. In some embodiments, the discriminator level for each m/z value may be selected such that the dead times associated with pulses from every m/z value are substantially equal. In this way, the dead times are not only reduced but made substantially equal for all ions across a broad range of m/z.

Although system and techniques for detecting ions using a variable threshold level are described herein in the context of a gas chromatography based mass spectrometry system, these techniques can also be applied to detecting ions in other contexts. As an example, a variable threshold level can be used to detect ions in systems such as an inductively coupled plasma based mass spectrometer system or a nuclear physics based instrument.

A simplified schematic diagram of an example mass spectrometry system 100 is shown in FIG. 1. The system 100 includes a gas chromatograph 102, an ion source 104, an ion transfer chamber 106, a quadrupole mass filter 108, an ion detector 110, a discriminator module 112, and a control module 114.

During operation of the system 100, samples are injected into an injector port 116 of the gas chromatograph 102, and enter into capillary column 118. The sample constituents flow through the column 118 and through a heated oven 120 (e.g., with the help of a flow of helium gas). The sample constituents are separated according to their relative retention in the column 118. For example, the separation of sample constituents can depend on the column's dimensions (e.g., length, diameter, film thickness), as well as its phase properties. The difference in the chemical properties between different molecules in the sample and their relative affinity for the stationary phase of the column promote separation of the molecules as the sample travels the length of the column.

The exit portion 122 of the column 118 passes through a heated transfer component 124 such that an exit end 126 of the column 118 is located within the ion source 104. Having been separated in the column 118, the sample constituents elute sequentially from the exit end 126 into the ion source 104.

In some implementations, the ion source 104 can be an electron ionization ion source. For example, as shown in FIG. 1, the ion source 104 can generate an electron beam 128 through an ion volume 130 of the ion source 104, causing a portion of the eluting constituents to be ionized by interaction with the electrons in the electron beam 128. Although an electron ionization ion source is shown in FIG. 1, other ion sources are also possible. For example, in some cases, the ion source 104 can be a chemical ionization (CI) ion source (e.g., as a part of a CI-MS system) or an inductively coupled plasma (ICP) ion source (e.g., as a part of an ICP-MS system).

The ion source 104 also generates an electric field within the ion volume 130 (illustrated in FIG. 1 by equipotential contours 132) by applying voltage(s) to an extraction electrode 136, and/or a repeller electrode (not shown), and/or the ion volume housing. The sample ions formed within ion volume 130 respond to the electric field, and are accelerated out of the ion source 104 through an aperture 138 in the extraction electrode 136.

The sample ions are extracted through the extraction electrode aperture 138, and are transferred by an ion transfer chamber 106 to the entrance of the quadrupole mass filter 108.

The transmission efficiency and resolving power of the quadrupole mass filter 108 depends on the characteristics of the beam of sample ions entering the quadrupole mass filter 108 (e.g., the radial positions, angles, and to a lesser extent, kinetic energies, of the sample ions as they enter the quadrupole mass filter 108). These ion beam characteristics are, in turn, limited by the ionization efficiency and emission characteristics of the ion source, in conjunction with limitations of the focusing properties of any ion transfer optics (e.g., DC electrode lenses) used in the system.

To improve these characteristics, in some cases, the ion transfer chamber 106 can include an ion guide 140 that generates a radio frequency (RF) field in the ion transfer chamber 106. In some cases, the ion transfer chamber 106 can also generate an axial electric field (i.e., an electric field extending along the direction of the path of travel of the sample ion beam). The ion transfer chamber 106 can also be pressurized with a gas. Sample ions exiting the ion source are passed into the ion transfer chamber 106, and are constrained by the RF field to oscillate about an ion guide axis 142 as they traverse the length of the ion guide 140. Collisions with the gas molecules dissipate the sample ions' kinetic energy, resulting in a reduction of their radial excursion and kinetic energies, such that, upon reaching the exit end 144 of the ion transfer chamber 106, the sample ions can be focused into the entrance of the quadrupole mass filter 108 with improved beam characteristics (e.g., less variation in radial positions and angles, and with lower kinetic energy), allowing greater ion transmission and/or resolving power by the mass filter, than with conventional electrostatic optics. This can also be beneficial, for example, as it improves the transmission efficiency for initially broad spatial and angular ion distributions, such as produced from the ion source 104.

The focused ion beam at the exit end 144 of the ion transfer chamber 106 is injected into the entrance of a quadrupole mass filter 108 for mass analysis of the sample ions. The quadrupole mass filter mass resolves the sample ions (e.g., based on their mass-to charge ratios (m/z)). As an example, the quadrupole mass filter 108 can include four parallel electrically conductive rods arranged in a 2×2 configuration, where each opposing rod pair is connected together electrically. A RF voltage with a DC offset voltage is applied between one pair of rods and the other. As sample ions travel down the quadrupole between the rods, only ions of a certain mass-to-charge ratio will reach the detector for a given ratio of voltages. Other ions have unstable trajectories and will collide with the rods. This permits selection of an ion with a particular m/z.

The mass-resolved ions exit through an exit end of the quadrupole mass filter 108, and are directed to the ion detector 110. The ion detector 110 records a charge induced or the current produced by the arrival of ions at the ion detector 110 (e.g., when an ion passes by or hits a detector surface of the ion detector 110). In some implementations, the ion detector 110 can generate a time-dependent electrical output signal (e.g., a time-dependent voltage or current signal) corresponding to the recorded charges or current.

The output signal is transmitted to the discriminator module 112 for processing. The discriminator module 112 identifies, based on the output signal, the arrival of ions at the ion detector 110. In some implementations, the discriminator module 112 can include a discriminator circuit 146 that distinguishes between changes in the output signal corresponding to the arrival of a particular ion (e.g., having a particular m/z) and changes in the output signal resulting from other factors (e.g., signal noise). In some implementations, the discriminator module 112 can count a number of ions arriving at the ion detector 110 over time. In some implementations, the discriminator circuit can be implemented using digital circuitry, an analog circuitry, software, or a combination thereof.

In some embodiments, the discriminator circuit 146 receives the output signal from the ion detector 110 and outputs a discriminator signal at a fixed voltage (or current) for a duration corresponding to the amount of time the output signal from the ion detector is above the threshold level (e.g., a square wave pulse). The square wave pulse from the discriminator circuit 146 may then be received by counting electronics (not shown) that count the number of square wave pulses received from the discriminator circuit 146. In some embodiments, the counting electronics may be separate from the discriminator module 112 and/or the discriminator circuit 146. For example, the counting electronics may be included in the control module 114 can/or as a separate component. In other embodiments, the counting electronics may be a part of the discriminator module 112 and/or the discriminator circuit 146.

In some implementations, the discriminator circuit 146 can directly process the output signal received from the ion detector 110. In some implementations, the discriminator module 112 can include one or more amplifiers 148 to amplify the output signal, prior to processing by the discriminator circuit 146. In some embodiments, there is no digital processing of the output signal between the ion detector 110 and the discriminator module 112.

The control module 114 is communicatively coupled to the gas chromatograph 102, the ion source 104, the ion transfer chamber 106, the quadrupole mass filter 108, the ion detector 110, and/or the discriminator module 112, and controls the operation of some or all of the other components of the system 100. For example, in some implementations, the control module 114 can provide instructions or commands to regulate the performance of some or all of the components of the system 100. In some implementations, the control module 114 can record data output by the discriminator module 112 regarding the ions, such as the number of ions arriving at the ion detector 110 and the m/z of each of those ions. In some implementations, the control module 114 can be implemented, at least in part, using one or more computing devices (e.g., one or more electronic processing devices, each having one or more microprocessors, such as personal computers, smartphones, tablet computers, server computers, etc.).

Although FIG. 1 shows a system 100 having a gas chromatograph 102, a gas chromatograph is not necessarily present in every implementation. In some implementations, ions can be introduced into an ion source 104 using other techniques (e.g., ions can be introduced directly into the ion source 104 without having first been separated by gas chromatography, such as using an inductively coupled plasma apparatus).

As described above, the ion detector can generate a time-dependent electrical output signal (e.g., a time-dependent voltage signal) corresponding to induced charges or current produced by the arrival of ions at the ion detector 110. In turn, the discriminator module 112 can identify, based on the output signal, the arrival of ions at the ion detector 110.

Figure 2:
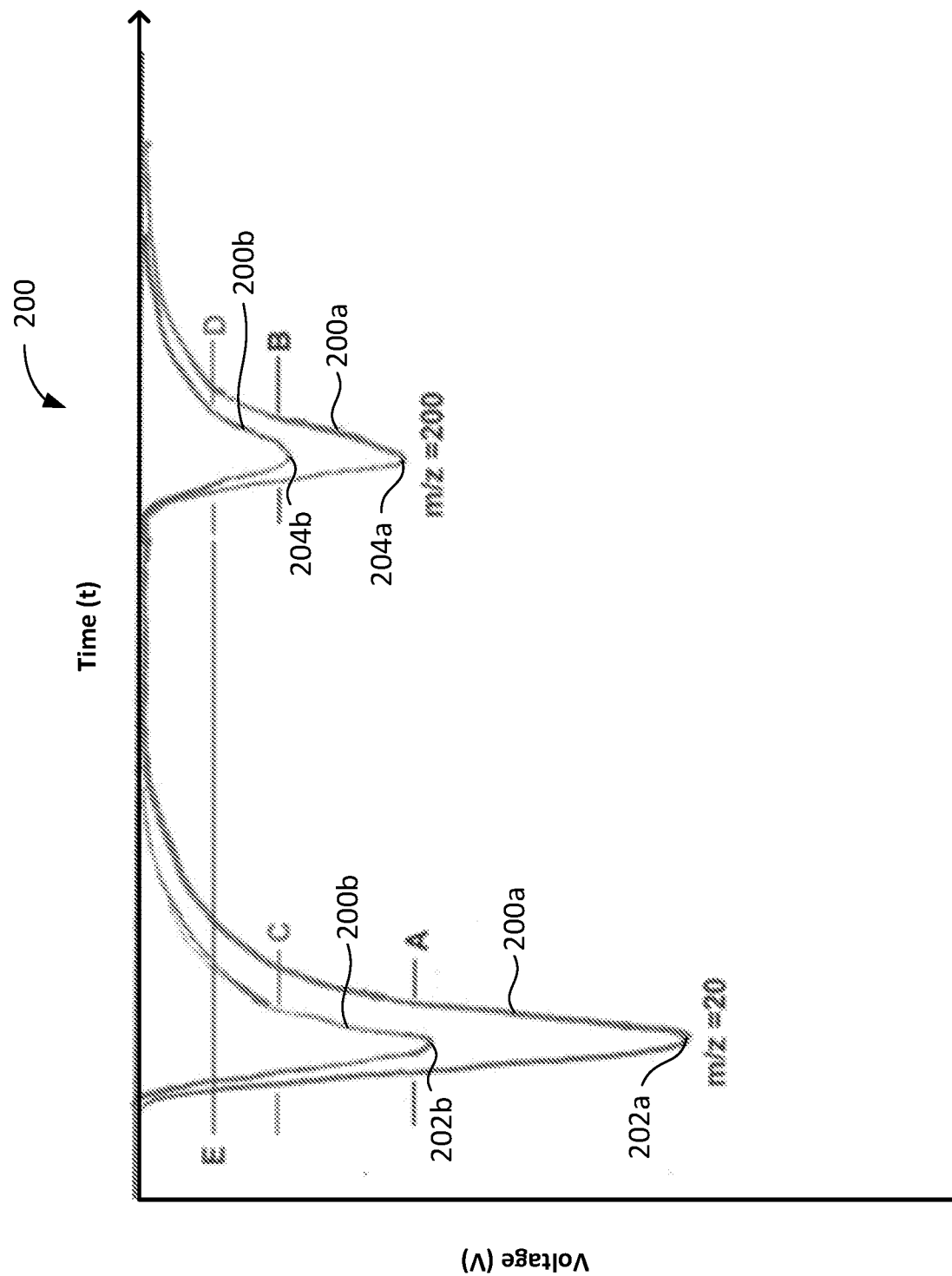
FIG. 2 is a diagram of example output signals generated by an ion detector.

FIG. 2 shows two simplified example output signals 200a and 200b generated by the ion detector 110. The first output signal 200a corresponds the sequential arrival of two ions having a m/z of 20 and a m/z of 200, respectively, at the ion detector 110, and measured according to first count rate (e.g., $10^6$ counts per second). The second output signal 200b corresponds the sequential arrival of two ions also having a m/z of 20 and a m/z of 200, respectively, at the ion detector 110, and measured according to second count rate that is higher than the first count rate (e.g., $10^7$ counts per second). In this example, the output signals 200a and 200b have a negative voltage polarity, where voltage increases in the downward direction in FIG. 2. For ease of illustration, the output signals 200a and 200b have been overlaid on top of each other. However, in practice, the output signals 200a and 200b can be generated one after another (e.g., sequentially over a period of time). Further, for ease of illustration, the output signals 200a and 200b are not necessary drawn to scale.

As shown in FIG. 2, the arrival of an ion at the ion detector 110 results in a pulse (e.g., inverse peak) in the voltage of the output signal. For example, the arrival of the ions having a m/z of 20 results in a pulse 202a in the output signal 200a, and a pulse 202b in the output signal 200b. Further, the arrival of the ions having a m/z of 200 results in a pulse 204a in the output signal 200a, and a pulse 204b in the output signal 200b.

In some implementations, the discriminator module 112 can distinguish between changes in the output signals corresponding to the arrival of ions and changes in the output signal resulting from other factors (e.g., signal noise). For example, the discriminator module 112 can compare the amplitude of the output signal with a threshold level (e.g., a "discriminator threshold"). If the output signal exceeds the threshold level at a particular point in time (e.g., a pulse in the output signal has an amplitude that is greater than the threshold level), the discriminator module 112 can determine that an ion had arrived at the ion detector 110 at that time. However, if the output signal remains below the threshold level during a period of time, the discriminator module 112 can determine that an ion did not arrive at the ion detector 110 during that time. Accordingly, the effects of signal noise in the output signal are suppressed.

In some implementations, the discriminator module 112 can output a discriminator signal having a higher amplitude (e.g., a square pulse corresponding to a binary value of "1") when the amplitude of output signal is greater than the threshold level, and a lower amplitude (e.g., a default lower amplitude corresponding to a binary value of "0") when the amplitude of output signal is less than the threshold level.

The discriminator signal can be used, for example, to identify specific points in time in which an ion arrived at the ion detector 110. Further, the discriminator signal can be used to count the number of ions that had arrived (e.g., by counting the number of pulses in the discriminator signal).

In some implementations, a single fixed threshold level can be used for multiple different use cases (e.g., when analyzing different samples according to different count rates). In some implementations, the threshold level can be pre-selected (e.g., specified by a manufacturer of the system 100 during a manufacturing or calibration process).

However, the use of a single fixed threshold level may be less suitable in certain circumstances. For instance, at least some ion detectors generate output signals with pulses that vary in amplitude depending on the mass of the ions arriving at the ion detectors, the m/z of the ions, and/or the count rate of the measurement process. As an example, discrete-dynode ion detectors (e.g., commonly used in inductively coupled plasma mass spectrometry (ICP-MS) systems) operating with an ion-to-electron conversion dynode voltage of 2000V or less may exhibit these characteristics. In particular, the amplitude of pulses output by the ion detector may decrease with an increase in the mass or m/z of the ions. Further, the amplitude of pulses output by the ion detector may decrease with an increase in count rate. Due to these variations in the amplitude, and associated variation in pulse duration, a single fixed threshold level may not be effective in accurately distinguishing pulses corresponding to the arrival of ions at the ion detector from pulses corresponding to other events (e.g., signal noise). Accordingly, the system may perform in a less effective manner.

For example, referring to FIG. 2, the output signal 200a (corresponding to a lower count rate) has a pulse 202a corresponding to an ion having a m/z of 20, and a pulse 204a corresponding to an ion having a m/z of 200. As shown in FIG. 2, the pulse 202a has a greater amplitude than the pulse 204a. Accordingly, a threshold level suitable for detecting the pulse 202a (e.g., a threshold level "A") may be too high to effectively detect the pulse 204a.

As another example, referring to FIG. 2, the output signal 200b (corresponding to a higher count rate) has a pulse 202b corresponding to an ion having a m/z of 20, and a pulse 204b corresponding to an ion having a m/z of 200. As shown in FIG. 2, the pulses 202b and 204b have a lower amplitude than the pulses 202a and 204a, respectively. Accordingly, threshold levels suitable for detecting pulses in the output signal 200a may too high to effectively detect pulses in the output signal 200b.

To address this issue, the discriminator module 112 can be configured to process output signals from the ion detector 110 according to a variable threshold level (e.g., a variable discriminator threshold). In the particular, the threshold level can be varied according to the mass of an ion, the m/z of the ion, the count rate of the ion detector, or any combination thereof. This can be beneficial, for example, in enabling the discriminator module 112 to distinguish between pulses corresponding to the arrival of ions at the ion detector from pulses corresponding to other events (e.g., signal noise). Accordingly, the system may perform in more effectively in a wider array of use cases.

In some implementations, the discriminator module 112 can select a suitable value for the variable threshold level based on one or more inputs. For example, the discriminator module 112 can receive (e.g., from the control module 114), data indicating the estimated mass of an ion (e.g., as filtered by the quadrupole mass filter 108), the estimated m/z of the ion (e.g., as filtered by the quadrupole mass filter 108), and/or the count rate of the ion detector (e.g., as specified by the ion detector 110 and/or the control module 114 during operation). Based on this information, the discriminator module 112 can select a particular value for the variable threshold level to identify the arrival of ions at the ion detector 110.

In some implementations, the count rate of the ion detector can be estimated experimentally. For example, the count rate of the ion detector can be estimated by conducting a "pre-scan" experiment with respect to a particular sample to establish the count rate (e.g., the signal strength) at each mass being measured (or to be measured) by the mass spectrometry system. An appropriate variable threshold level can be selected based on the estimated count rate, and the selected variable threshold level can be used to detect the arrival of ions for that sample in a follow up experiment (e.g., as described herein). In some implementations, the pre-scan experiment can be conducted immediately prior to conducting the follow up experiment.

In some implementations, the discriminator module 112 can select a suitable value for the variable threshold level according to a negative correlation (e.g., in inversely proportion relationship) between the variable threshold level and one or more of (i) mass of an ion, (ii) the estimated m/z of the ion, and/or the count rate of the ion detector. For example, as the ion mass increases, the discriminator module 112 can adjust the variable threshold level lower. As another example, as the m/z of the ion increases, the discriminator module 112 can adjust the variable threshold level lower. As another example, as the count rate increases, the discriminator module 112 can adjust the variable threshold level lower.

In some implementations, the discriminator module 112 can select a particular value for the variable threshold level using a look up table (e.g., one or more data records indicating, each particular combination of input values, a corresponding output value). Simplified examples of look up tables are shown in Tables 1-3.

TABLE 1

Example look up table for selecting the value of the variable threshold level based on the m/z of an ion.

| m/z | Value of Variable Threshold Level |
|---|---|
| $A_1$ | $Z_1$ |
| $A_2$ | $Z_2$ |
| $A_3$ | $Z_3$ |

TABLE 2

Example look up table for selecting the value of the variable threshold level based on the m/z of an ion and the count rate of the ion detector.

| m/z | Count Rate | Value of Variable Threshold Level |
|---|---|---|
| $A_1$ | $B_1$ | $Z_1$ |
| $A_1$ | $B_2$ | $Z_2$ |
| $A_1$ | $B_3$ | $Z_3$ |
| $A_2$ | $B_1$ | $Z_4$ |
| $A_2$ | $B_2$ | $Z_5$ |
| $A_2$ | $B_3$ | $Z_6$ |
| $A_3$ | $B_1$ | $Z_7$ |
| $A_3$ | $B_2$ | $Z_8$ |
| $A_3$ | $B_3$ | $Z_9$ |

TABLE 3

Example look up table for selecting the value of the variable threshold level based on the mass of an ion.

| Mass | Value of Variable Threshold Level |
|---|---|
| $C_1$ | $Z_1$ |
| $C_2$ | $Z_2$ |
| $C_3$ | $Z_3$ |

In some implementations, the look up table can specify, given particular input values (e.g., input values $A_i$, $B_j$, and/or $C_k$), the corresponding value of the variable threshold level (e.g., output value $Z_n$). In some implementations, some or all of the input values can be discrete values. In some implementations, some or all of the input values can be ranges of values. Further, the look up table can include any number of rows (e.g., bins) corresponding to any number of different combinations of input values and output values.

For instance, if the total m/z range being detected is 0 to 300, there can be any number of rows or bins (e.g., 2, 3, 4, 5, or more), each with its own value for the variable threshold level. As an example, if there are two ranges, the m/z range 0-150 can correspond to a variable threshold level of 20 mV, and the m/z range 150-300 can correspond to a variable threshold level of 150 mV. As another example, if there are three ranges, the m/z range 0-100 can correspond to a variable threshold level of 20 mV, the m/z range 100-200 can correspond to a variable threshold level of 80 mV, and the m/z range 200-300 can correspond to a variable threshold level of 160 mV. Although example values are described above, these are merely illustrative examples. In practice, any number of input values (including different ranges of input values) and output values can be used in any number of different combinations.

In some implementations, the values in a look up table can be determined empirically. For example, experiments can performed under a range of conditions, such as a range of ion masses, m/z ranges, and/or count rate ranges. Suitable values for the variable threshold level can be empirically selected for each set of conditions.

In some implementations, the look up table can be stored by the discriminator module 112 (e.g., in one or more storage media and/or memory modules) and selectively retrieved during operation. In some implementations, the look up table can be stored by a component other than the discriminator module 112 (e.g., in one or more storage media and/or memory modules of the control module 114) and provided to the discriminator module 112 during operation.

In some implementations, the discriminator module 112 can select a particular value for the variable threshold level using a mathematical function. For instance, a function can output a particular value of the variable threshold level, given one or more input values. As an example, a function that outputs a value of the variable threshold level given the m/z of an ion could be:

THRESHOLD=BASE_THRESHOLD+
  THRESHOLD_SLOPE*MASS_TO_CHARGE_RATIO   (Eq. 1)

where THRESHOLD is the outputted value of the variable threshold level, BASE_THRESHOLD is a constant value, THRESHOLD_SLOPE is a slope value, and MASS_TO_CHARGE_RATIO is the m/z of an ion. In practice, other functions are also possible, depending on the implementation. For example, a function can have different and/or additional inputs than those shown above. Further, the function may define different relationships between them (e.g., proportional, exponential, etc.).

In some implementations, the function can be determined empirically. For example, experiments can performed under a range of conditions, such as a range of ion masses, m/z ranges, and/or count rate ranges. A suitable function (e.g., having particular values of input values and/or relationships between them) can be empirically selected based on the results of the experiments. In some implementations, a function can be determined using regression analysis (e.g., linear regression analysis, simple regression analysis, polynomial regression analysis, general linear model analysis, or any other analysis) of the experimental results.

In some implementations, the function can be stored by the discriminator module 112 (e.g., in one or more storage media and/or memory modules) and selectively retrieved during operation. In some implementations, the function can be stored by a component other than the discriminator module 112 (e.g., in one or more storage media and/or memory modules of the control module 114) and provided to the discriminator module 112 during operation.

In some implementations, the discriminator module 112 can be configured to select a value of the variable threshold level that it is equal (or approximately equal) to one half of the estimated peak amplitude of the pulse. This amplitude may be referred to as the "full width, half maximum" (FWHM) peak value of a pulse. As an example, as shown in FIG. 2, the pulse 202a has a FWHM peak value of A, the pulse 204a has a FWHM peak value of B, the pulse 202b has a FWHM peak value of C, and the pulse 204b has a FWHM peak value of D.

Selecting a value of the variable threshold level that it is equal (or approximately equal) to the FWHM peak value of a pulse can provide various technical benefits. For example, when a discriminator module 112 processes the pulse of an output signal according to a variable threshold level equal to (or approximately equal to) the pulse's FWHM peak value, the resulting discriminator signal generated by the discriminator module 112 will have a pulse (e.g., a square pulse) that has a width of half (or approximately half) of the pulse in the output signal of the ion detector 110. This enables the discriminator module 112 to reduce false positives (e.g., by suppressing signal noise in the output signal), while also remaining sensitive enough to distinguish between multiple ions that are received close in time (e.g., by generating a discriminator signal having multiple square pulses corresponding to the arrival of multiple ions, rather than a single overlapping square pulse). Accordingly, the discriminator module 112 can exhibit a linear response (or an approximately linear response) over a wider dynamic range. Further, these benefits can be achieved without extensive modifications to the other components of the system 100 (e.g., the gas chromatograph 102, the ion source 104, the ion transfer chamber 106, the quadrupole mass filter 108, and/or ion detector 110).

In contrast, if the discriminator module 112 were to process a pulse of an output signal according to a variable threshold level substantially higher than the FWHM peak value, the discriminator module 112 may fail to detect the arrival of certain ions reliably (e.g., ions that result in pulses at or below the variable threshold level). For example, referring to FIG. 2, if the discriminator module 112 were to process the pulse 204a according to the threshold A, the discriminator module 112 may fail to determine the presence of the pulse 204a, resulting in a false negative.

Further, if the discriminator module 112 were to process a pulse of an output signal according to a variable threshold level lower than the FWHM peak value, the discriminator module 112 may fail to suppress signal noise reliably, regarding in false positives. Further, the discriminator module 112 would generate a discriminator signal having a square pulse with a width greater than half of the pulse of the output signal. Due to this width, the discriminator module 112 may have difficulty distinguishing between ween multiple ions that are received close in time (e.g., due to the overlapping pulses in the output signal, resulting in a single combined pulse in the discriminator signal).

Accordingly, selecting the variable threshold level such that it is equal to (or approximately equal to) a pulse's FWHM peak value strikes a balance between reducing false positives and reducing false negatives, while also enabling the discriminator module 112 to better distinguish between multiple ions that are received close in time.

In a similar manner as discussed above, the FWHM peak values can be determined empirically. For example, experiments can performed under a range of conditions, such as a range of ion masses, m/z ranges, and/or count rate ranges. Suitable FWHM peak values can be empirically selected for each set of conditions. In turn, the FWHM peak values can be used to generate look up tables and/or functions (e.g., as described above) to control the operation of the discriminator module 112.

In some implementations, the values of the variable discriminator threshold level can be as follows:

TABLE 4

Example values of the variable threshold level based on the mass of an ion.

| Mass (amu) | Value of Variable Threshold Level (mV) |
|---|---|
| 7 | 300 |
| 56 | 120 |
| 115 | 60 |
| 238 | 20-30 |

These values can be particularly useful, for example, in distinguishing ions having a wide range of masses (e.g., elemental lithium (Li) having a mass of 7.016 amu, elemental iron (Fe) having a mass of 56.9354 amu, elemental indium (In) having a mass of 114.904 of amu, and elemental uranium (U) having a mass of 238.05 amu). However, in practice, other examples are also possible, depending on the implementation.

In some implementations, the discriminator module 112 can process the output signal from the ion detector 110 in real time or substantially real time (e.g., as the output signal is received from the ion detector 110). For instance, the discriminator module 112 can include firmware (e.g., embedded software or other programming), digital circuitry, and/or analog circuitry that enables it to process the output signal in real time or substantially real time. This is can be beneficial, for example, in reducing the computational resources required to process the output signal. For example, the discriminator module 112 can continuously receive the output signal, and as it is doing so, generate a corresponding discriminator signal in real time or substantially real time (e.g., output the discriminator signal in a data "stream"). Accordingly, the output signal need not be separately recorded.

However, in some implementations, the discriminator module 112 can also conduct a "post-acquisition" analysis of the output signal from the ion detector 110 (e.g., process the output signal after the entirety of the output signal had been recorded). In some implementations, this analysis can be performed by a system or device separate from the system 100 (e.g., a separate computer system having software and/or hardware configured to process the output signal in the manner described herein).

Example Experimental Data

Various experiments were conducted to demonstrate the feasibility of the techniques described herein.

In brief, it was experimentally noted that the pulse amplitude of the output signal generated by the experimental ion detector became lower as the count rate increased. This is to be expected, as the ion detector incorporates current-limiting features in its avalanche photodiode stage (e.g., it was not specifically designed as a "high count rate detector"). This reduction in pulse amplitudes (sometimes called "gain depression") is particularly evident at higher masses, where the pulses are smallest to begin with. Therefore, the discriminator level was reduced in to increase the count rate capacity.

The table below summarizes the results of these high-count-rate capability studies. Note that results from Test 10 were obtained with monostable vibrator "dead time" set to 13 ns comparing to the previous results.

However, as described herein, operating a discriminator module according to a single fixed threshold level may not be suitable for all use cases. For example, FIG. 3B shows example plots 310a and 310b showing the relationship between an analog signal and a pulse mode signal from a dual mode ion detector when analyzing Ba 138 (plot 310a) and Ce 140 (plot 310b). Here, the pulse mode signal corresponds to a number of ions counted during the digital mode of operation using a discriminator module having a fixed threshold level of 200 mV. As shown above, the relationship between the analog and pulse mode signals is no longer linear, particularly as the number of counts increases. In fact, when the pulse mode signal reaches a maximum (e.g., $23 \times 10^6$ counts per second), it begins to decrease as the pulses start to fall below the discriminator threshold at high count rates. This non-linearity (e.g., a disagreement between the results obtained via an analog detection mode and a digital detection mode) is not desirable, as it introduces a mode-dependent bias on the measurements.

Figure 3A:
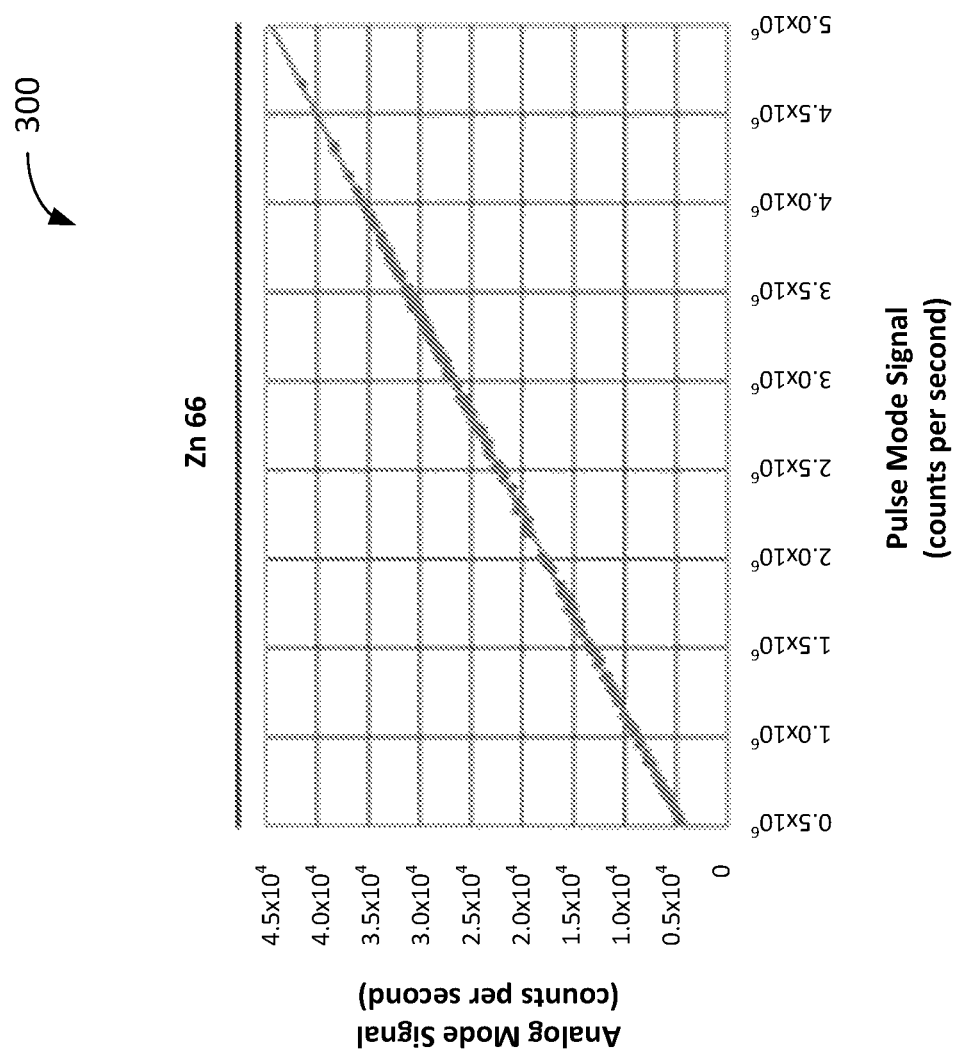
FIGS. 3A-3E show an example effect of a variable discriminator threshold level and detector "gain depression" at high count rates.
Figure 3B:
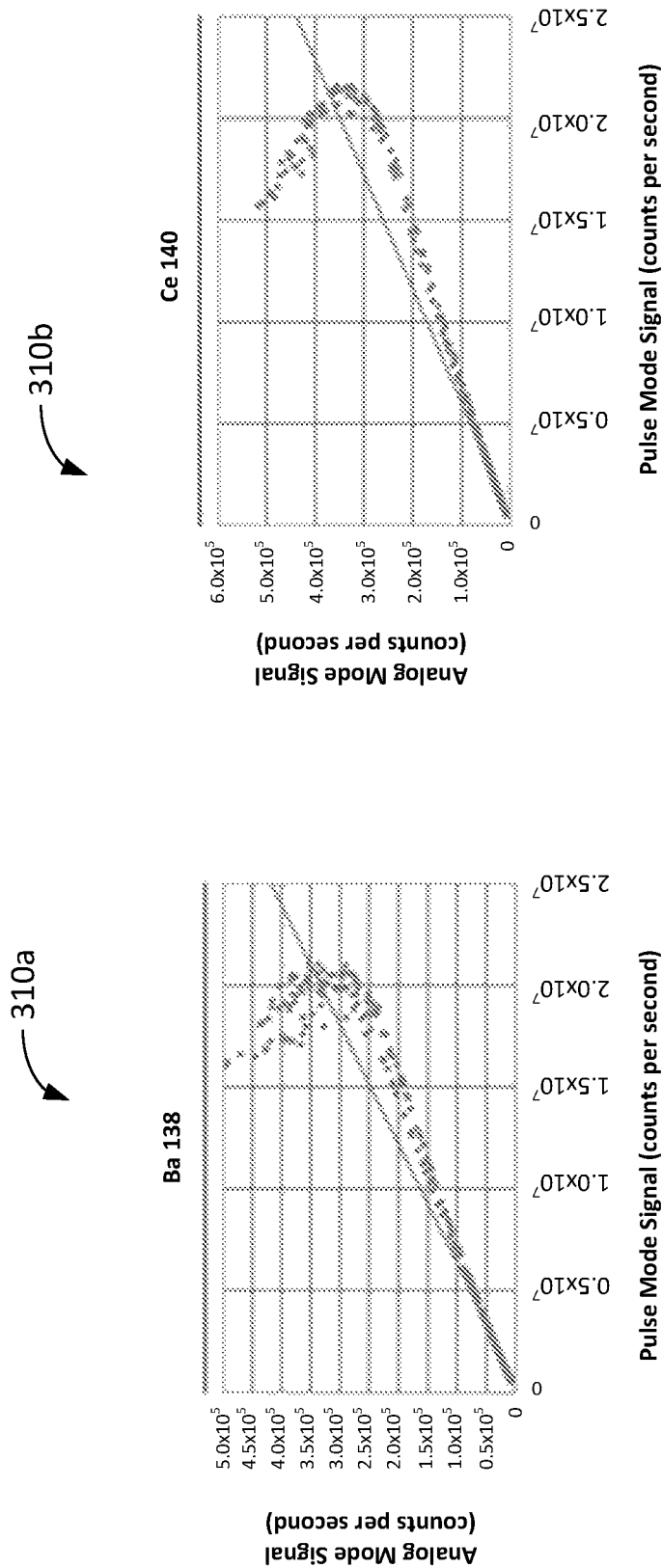
Figure 3C:
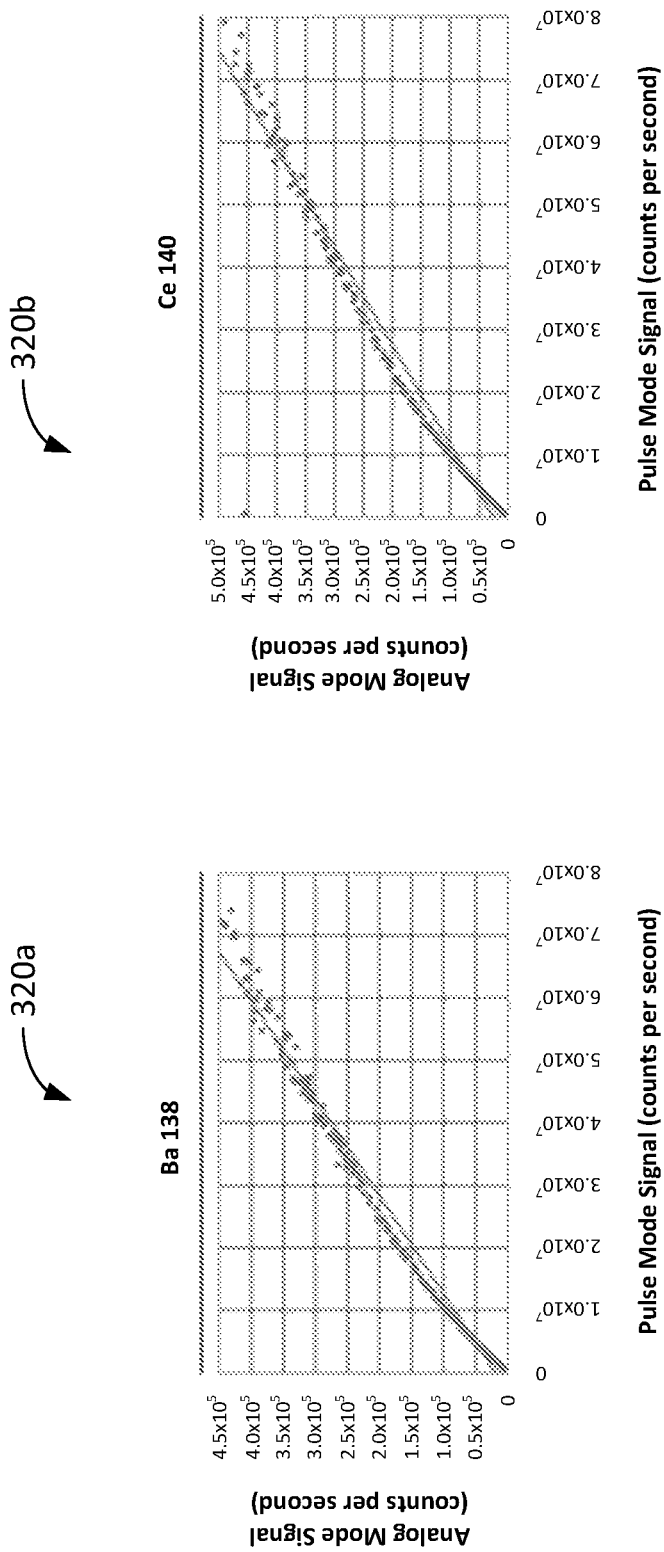

However, as shown in FIG. 3C, when the threshold level is reduced to 40 mV (with no other changes to the operational parameters), the results show improved linearity (e.g., as shown in plots 320a and 320b). In particular, the pulse module signal response becomes much more linear, and extends up to $80 \times 10^6$ counts per second.

TABLE 5

Summary of linearity and dynamic range with a Hamamatsu Hybrid Avalanche Photodiode (APD) Detector (Hamamatsu Photonics K.K., Hamamatsu City, Japan).

| Test | Discriminator Threshold Level (mV) | Analog Preamp Gain | Measured Analog Gain (115 In) | Estimated Crossover (MHz) | Software Limit | Nmax (115 In) | Observed Max Pulse Count Rate | Dead Time Setting (nsec) | Notes |
|---|---|---|---|---|---|---|---|---|---|
| 1 | 80 | 0.23 | 2500 | 9 | 3e7 | 5.0e9 | 2.5e7 | 35 (std) | very linear |
| 2 | 80 | 0.10 | | 20 | 8e7 | | 3.3e7 | 35 | non linear |
| 3 | 80 | 0.10 | 829 | 20 | 8e7 | 1.5e10 | 5.5e7 | 45 | fairly linear |
| 4 | 200 | 0.10 | | 20 | 8e7 | | 2.2e7 | 45 | non linear |
| 5 | 200 | 0.10 | | 20 | 8e7 | | 1.6e7 | 30 | non linear |
| 6 | 40 | 0.10 | | 20 | 8e7 | | 7.9e7 | 45 | non linear |
| 7 | 40 | 0.10 | | 20 | 8e7 | | 5.9e7 | 39 | fairly linear |
| 8 | 40 | 0.07 | 879 | 29 | 8e7 | 1.4e10 | 6.5e7 | 39 | fair to good linearity |
| 9 | 30 | 0.07 | 550 | 29 | 8e7 | 2.2e10 | 7.5e7 | 39 | fair to good linearity |
| 10 | 30 | 0.07 | 765 | 29 | 8e7 | 1.6e10 | 5.5e7 | 33 | very good linearity |

As shown above, optimum linearity of response in pulse counting mode (e.g., approaching 75 million counts/sec, after software correction) was achieved using relatively low discriminator thresholds in the 30-40 mV range.

FIGS. 3A-3E show an example effect of a variable discriminator threshold level and detector "gain depression" at high count rates.

FIG. 3A shows an example plot 300 of an "ideal" relationship between an analog signal and a pulse mode signal from a "dual mode" ion detector (e.g., an ion detector capable of detecting ions according to either analog mode of operation and a digital mode of operation) when analyzing Zn 66. The analog signal corresponds to a number of ions counted during the analog mode of operation of the ion detector. The pulse mode signal corresponds to a number of ions counted during the digital mode of operation using a discriminator module having a fixed threshold level. As shown in FIG. 3A, the relationship between the analog and pulse mode signals is linear across the dynamic range of the ion detector.

Figure 3D:
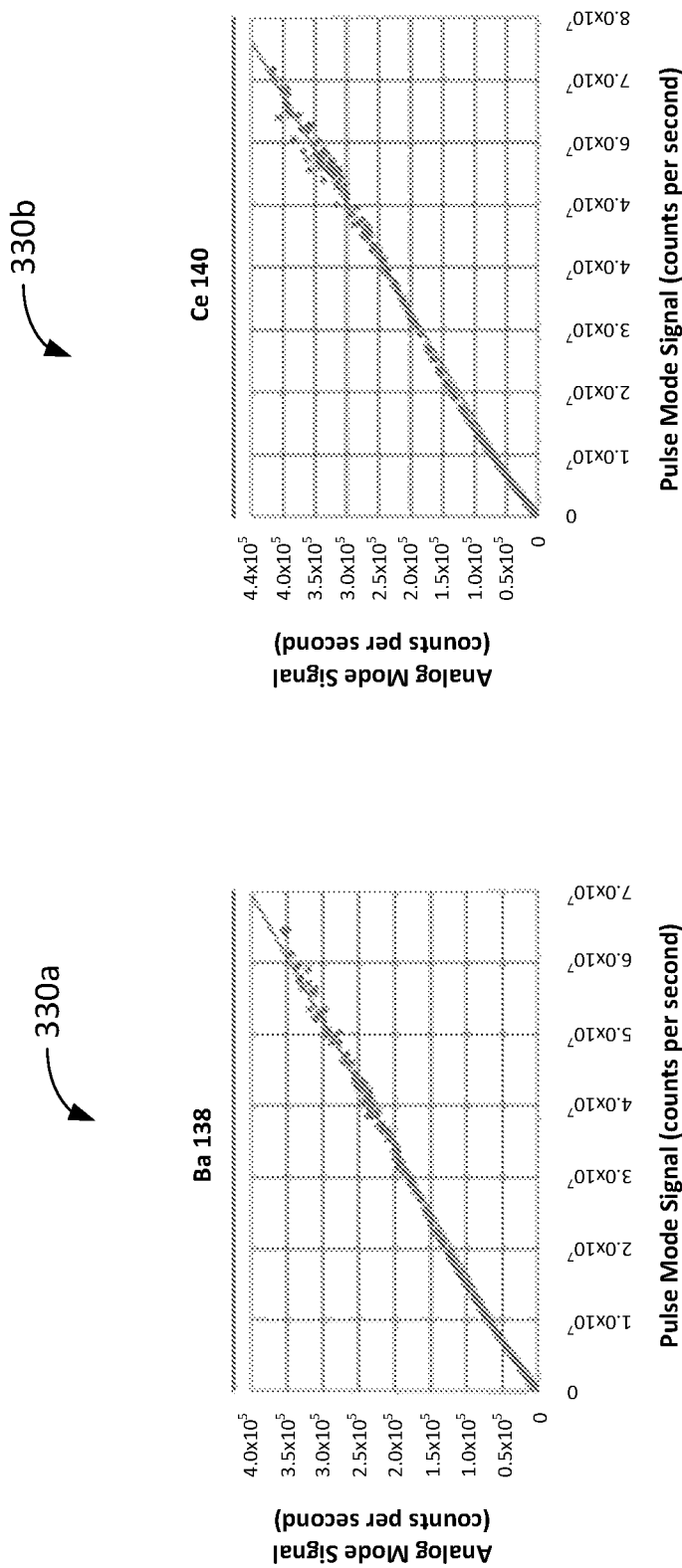

As shown in FIG. 3D, when the threshold level is further reduced to 30 mV, and the dead time parameter is adjusted (e.g., to 39 nsec in this example), the overall response becomes more linear, and extends to beyond $70 \times 10^6$ counts per second (e.g., as shown in plots 330a and 330b). The slight curvature of the plots indicates that the dead time parameter could be reduced slightly for further linearity.

Figure 3E:
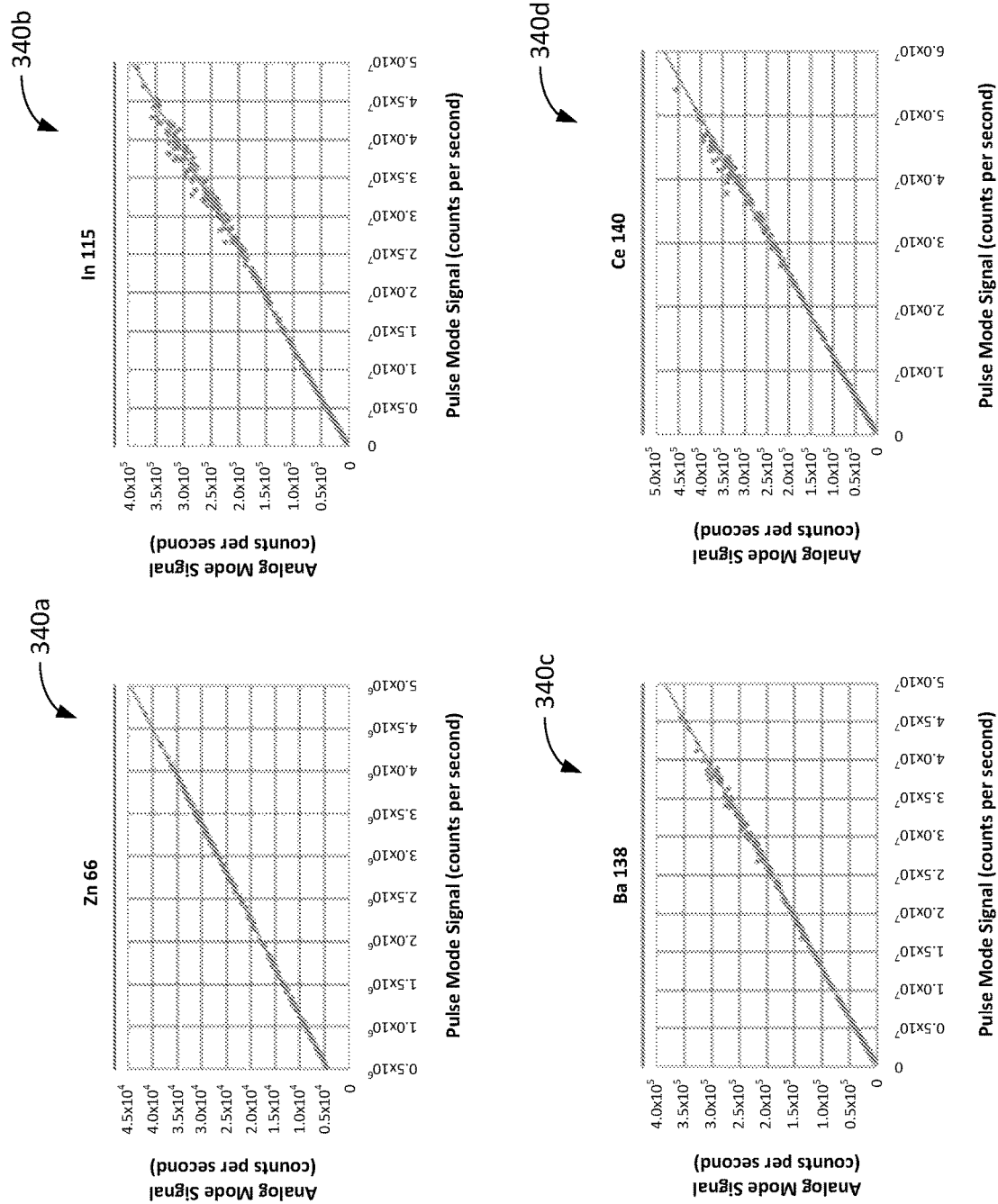

As shown in FIG. 3E, with a minor modification to the signal handling system (e.g., to reduce width of monostable vibrator pulse down to 7 ns with total "dead time" of about 13 ns), and optimized Syngistix (PerkinElmer, Waltham, Mass.) dead time parameter of 33 nsec, a good compromise between linearity and count rate capability (to beyond $50 \times 10^6$ cps) is achieved (e.g., as shown in plots 340a-340d).

Example Process

Figure 4:
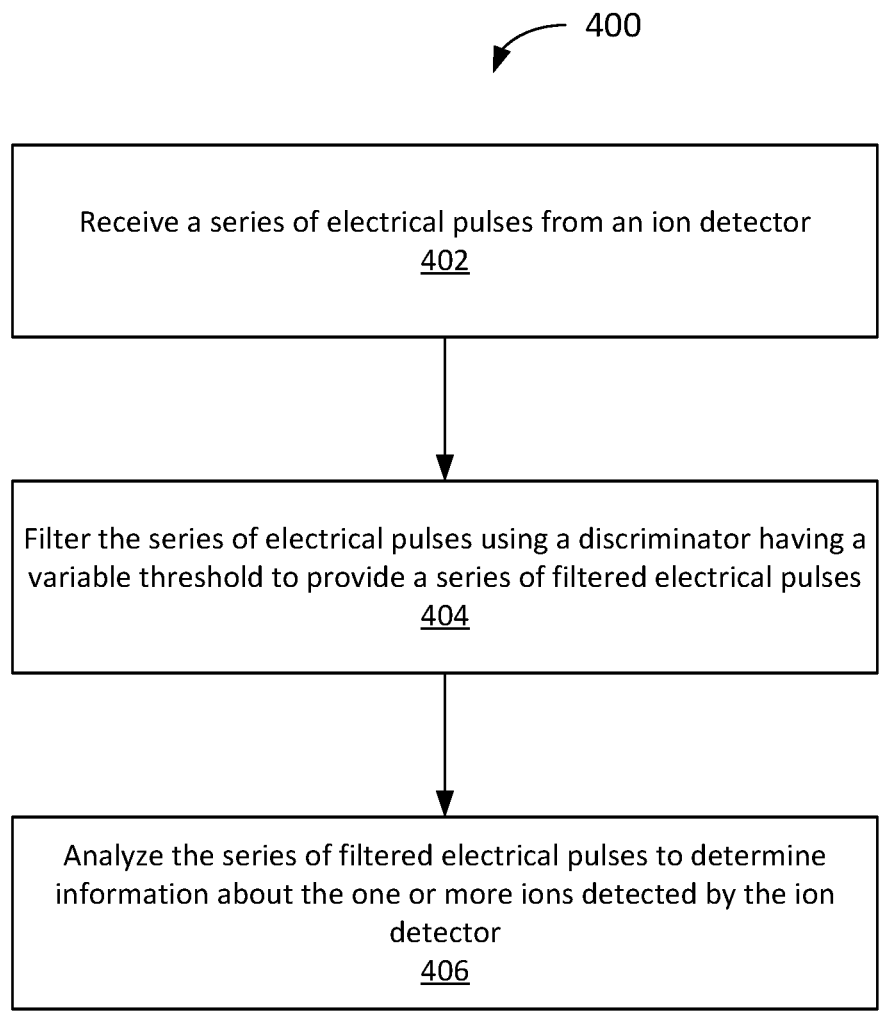
FIG. 4 is a flow chart diagram of an example process for determining information regarding one or more ions.

An example process 400 for determining information regarding one or more ions shown in FIG. 4. In some implementations, the process 400 can be performed by one or more of the systems described herein (e.g., the system 100 as shown and described in FIG. 1).

According to the process 400 a series of electrical pulses is received from an ion detector (step 402). Each pulse corresponds to detection of one or more ions by the ion detector. Each electrical pulse has an amplitude and a peak width related to an operational parameter of a system including the ion detector. As an example, referring to FIG. 1, a discriminator module 112 can receive one or more output signals from an ion detector 110. As shown in FIG. 2, an output signal can include a number of pulses, each corresponding to detection of one or more ions by the ion detector 110. Each pulse have a particular amplitude and peak width related to the mass of an ion, the m/z of the ion, and/or the count rate of the ion detector 110. In some implementations, the series of pulses can be voltage pulses (e.g., having a particular voltage amplitude). In some implementations, the series of pulses can be current pulses (e.g., having a particular current amplitude).

The series of electrical pulses is filtered using a discriminator having a variable threshold to provide a series of filtered electrical pulses (step 404). In some implementations, the variable threshold can be a variable threshold voltage (e.g., when the pulses are voltage pulses). In some implementations, the variable threshold can be a variable threshold current (e.g., when the pulses are current pulses).

The filtering includes adjusting the variable threshold based on a value of the operational parameter for each electrical pulse. As an example, as described with respect to FIGS. 1 and 2, the value of the variable threshold can be selected based on the estimated mass of an ion (e.g., as filtered by the quadrupole mass filter 108), the estimated m/z of the ion (e.g., as filtered by the quadrupole mass filter 108), and/or the count rate of the ion detector (e.g., as specified by the ion detector 110 and/or the control module 114 during operation). In some implementations, the value of the variable threshold can be selected using a look up table or a mathematical function. Further, the discriminator module 112 can output a corresponding discriminator signal a higher amplitude (e.g., a square pulse corresponding to a binary value of "1") when the amplitude of a pulse in the output signal is greater than the threshold level, and a lower amplitude (e.g., a default lower amplitude corresponding to a binary value of "0") when the amplitude of pulse in the output signal is less than the threshold level.

In some implementations, the operational parameter cam be the mass-to-charge ratio and the variable threshold can be decreased for ions with increasing mass-to-charge ratio.

In some implementations, the operational parameter can be the count rate (e.g., of the ion detector) and the variable threshold of the discriminator can be decreased for increasing count rates.

The series of filtered electrical pulses is analyzed to determine information about the one or more ions detected by the ion detector (step 406). As an example, referring to FIGS. 1 and 2, the discriminator signal output by the discriminator module 112 can be used to identify specific points in time in which an ion arrived at the ion detector 110. Further, the discriminator signal can be used to count the number of ions that had arrived (e.g., by counting the number of pulses in the discriminator signal). In some implementations, the information about the one or more ions can include a mass of each of the one or more ions.

Example Computer Systems

Some implementations of subject matter and operations described in this specification can be implemented in digital electronic circuitry, or in computer software, firmware, or hardware, including the structures disclosed in this specification and their structural equivalents, or in combinations of one or more of them. For example, the discriminator module 112 and/or the control module 114 can be implemented using digital electronic circuitry, or in computer software, firmware, or hardware, or in combinations of one or more of them. As another example, some or all of the process 400 can be implemented using digital electronic circuitry, or in computer software, firmware, or hardware, or in combinations of one or more of them Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
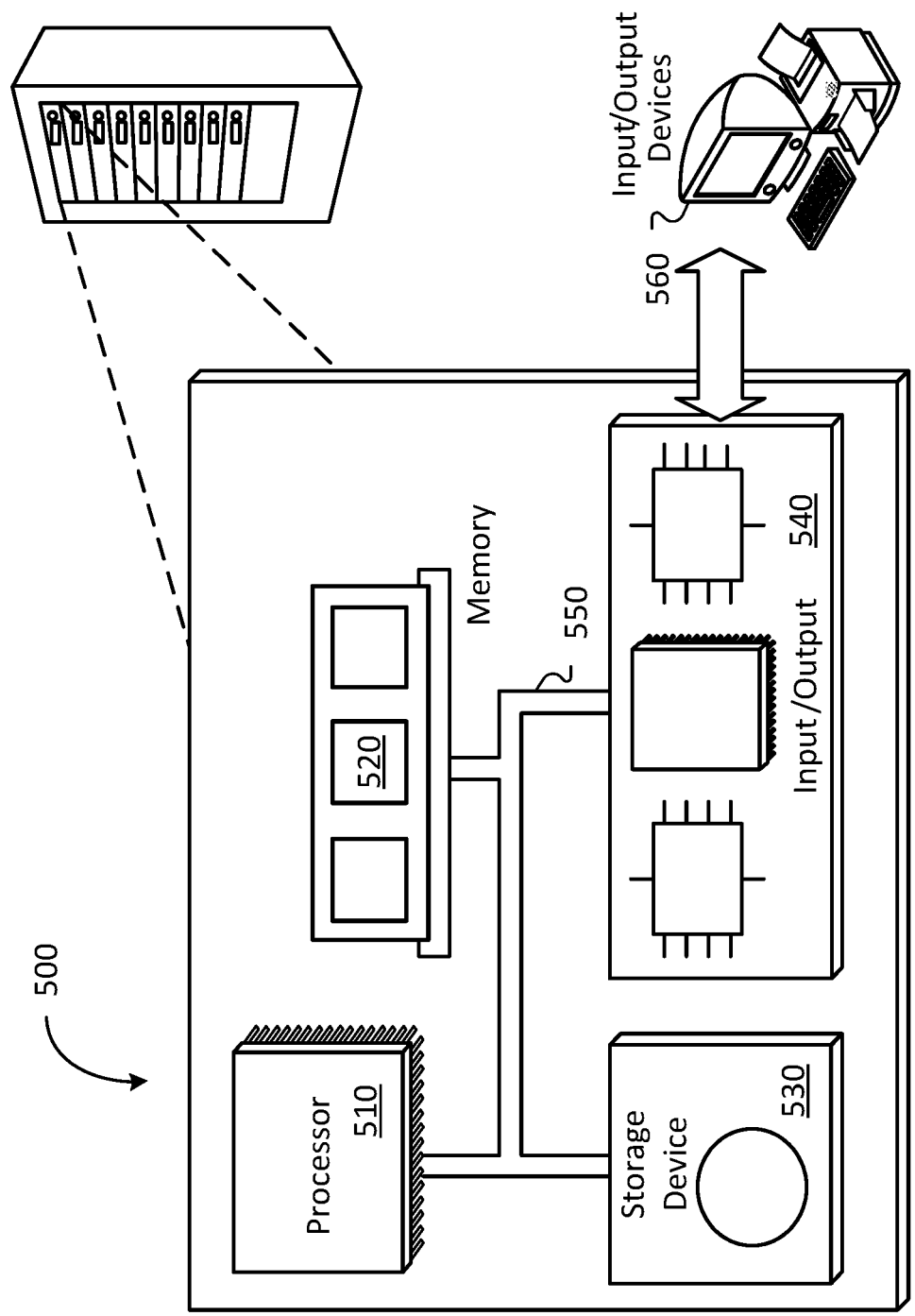
FIG. 5 is a schematic diagram of an example computer system.

FIG. 5 shows an example computer system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular non-limiting examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

What is claimed is:

1. A system, comprising:
   an ion detector arranged to detect ions during operation of the system and to generate a signal pulse in response to the detection of an ion, the signal pulse having a peak amplitude related to at least one operational parameter of the system; and
   a signal processing apparatus in communication with the ion detector and configured to analyze signal pulses from the ion detector and determine information about the detected ions during operation of the system based on the signal pulses,
   wherein the signal processing apparatus comprises a discriminator circuit, and
   the signal processing apparatus being programmed to vary a threshold of the discriminator circuit based on the at least one operational parameter of the system during operation of the system,
   wherein at least one of:
   (i) the at least one operational parameter of the system comprises a mass-to-charge ratio of the detected ions, and the signal processing apparatus is programmed to reduce the threshold in response to an increase in the mass-to-charge ratio of the detected ions, or
   (ii) the at least one operational parameter comprises a count rate of the detected ions, and the signal processing apparatus is programed to reduce the threshold in response to an increase in the count rate of the detected ions.

2. The system of claim 1, wherein the discriminator circuit is an analog circuit.

3. The system of claim 1, wherein the signal processing apparatus comprises a memory storing a look up table relating different values for the at least one operational parameter to different thresholds for the discriminator circuit, and the signal processing apparatus is programmed to vary the threshold according to the look up table.

4. The system of claim 1, wherein the signal processing apparatus is programmed to vary the threshold based on measurement of the at least one operational parameter during operation of the system.

5. The system of claim 1, wherein the signal processing apparatus is programmed to vary the threshold so that signal pulses from ions having different masses have approximately equal full-width-at-half-maximum (FWHM) values.

6. The system of claim 1, wherein the signal processing apparatus is arranged so that the discriminator circuit receives the signal pulses directly from the ion detector.

7. The system of claim 1, wherein the signal processing apparatus further comprises an amplifier arranged to receive signals from the ion detector and send amplified signals to the discriminator circuit.

8. The system of claim 1, wherein the ion detector is a discrete-dynode detector.

9. The system of claim 1, wherein the system is a mass spectrometry (MS) system comprising an ion source.

10. The system of claim 9, wherein the MS system is an inductively coupled plasma MS (ICP-MS) system.

11. The system of claim 9, wherein the MS system comprises a quadrupole mass analyzer in an ion path from the ion source to the ion detector.

12. A method, comprising:
receiving a series of electrical pulses from an ion detector, each pulse corresponding to detection of one or more ions by the ion detector, each electrical pulse having an amplitude and a peak width related to one or more operational parameters of a system comprising the ion detector;
filtering the series of electrical pulses using a discriminator circuit having a variable threshold to provide a series of filtered electrical pulses, wherein at least one of:
(i) the one or more operational parameters of the system comprises a mass-to-change-ratio of each ion, and the filtering comprises decreasing the variable threshold in response to an increase in the mass-to-charge ratio of the ions, or
(ii) the one or more operational parameters of the system comprises a count rate, and the filtering comprises decreasing the variable threshold in response to an increase in the count rate; and
analyzing the series of filtered electrical pulses to determine information about the one or more ions detected by the ion detector.

13. The method of claim 12, wherein the information about the one or more ions comprises a mass of each of the one or more ions.

14. The method of claim 12, further comprising:
obtaining a look up table relating different values for the at least one operation parameter to different thresholds for the discriminator circuit, and
varying the threshold according to the look up table.

15. The method of claim 12, further comprising:
varying the threshold based on measurement of the at least on operational parameter during operation of the system.

16. The method of claim 12, further comprising:
varying threshold so that signal pulses from ions having different masses have approximately equal full-width-at-half-maximum (FWHM) values.

17. The method of claim 12, wherein the system is a mass spectrometry (MS) system comprising an ion source and a quadrupole mass analyzer in an ion path from the ion source to the ion detector.

18. A non-transitory computer readable medium containing program instructions to cause a signal processing apparatus to perform the following steps:
receiving a series of electrical pulses from an ion detector, each pulse corresponding to detection of one or more ions by the ion detector, each electrical pulse having a amplitude and a peak width related to one or more operational parameters of a system comprising the ion detector;
filtering the series of electrical pulses using a discriminator circuit having a variable threshold to provide a series of filtered electrical pulses, wherein at least one of:
(i) the one or more operational parameters of the system comprises a mass-to-change-ratio of each ion, and the filtering comprises decreasing the variable threshold in response to an increase in the mass-to-charge ratio of the ions, or
(ii) the one or more operational parameters of the system comprises a count rate, and the filtering comprises decreasing the variable threshold in response to an increase in the count rate; and
analyzing the series of filtered electrical pulses to determine information about the one or more ions detected by the ion detector.

19. The non-transitory computer readable medium of claim 18, the steps further comprising:
obtaining a look up table relating different values for the at least one operation parameter to different thresholds for the discriminator circuit, and
varying the threshold according to the look up table.

20. The non-transitory computer readable medium of claim 18, the steps further comprising:
varying the threshold based on measurement of the at least on operational parameter during operation of the system.

21. The non-transitory computer readable medium of claim 18, the steps further comprising:
varying threshold so that signal pulses from ions having different masses have approximately equal full-width-at-half-maximum (FWHM) values.

22. The non-transitory computer readable medium of claim 18, wherein the system is a mass spectrometry (MS) system comprising an ion source and a quadrupole mass analyzer in an ion path from the ion source to the ion detector.

* * * * *

UNITED STATES PATENT AND TRADEMARK OFFICE
CERTIFICATE OF CORRECTION

| | |
|---|---|
| PATENT NO. | : 11,315,775 B2 |
| APPLICATION NO. | : 16/739536 |
| DATED | : April 26, 2022 |
| INVENTOR(S) | : William Fisher and Bohdan Atamanchuk |

It is certified that error appears in the above-identified patent and that said Letters Patent is hereby corrected as shown below:

On the Title Page

Item (73) (Assignee), Line 1, delete "PERKINELMFR" and insert -- PERKINELMER --

Signed and Sealed this
Twenty-eighth Day of June, 2022

Katherine Kelly Vidal
*Director of the United States Patent and Trademark Office*